United States Patent [19]

Siegrist et al.

[11] Patent Number: 4,923,214
[45] Date of Patent: May 8, 1990

[54] SEAT BELT ANCHORAGE

[75] Inventors: Ronald R. Siegrist, Grass Lake; Tod A. Shivak, Ypsilanti, both of Mich.

[73] Assignee: Hoover Universal, Inc., Ann Arbor, Mich.

[21] Appl. No.: 301,863

[22] Filed: Jan. 26, 1989

[51] Int. Cl.$^5$ ............................................. B60R 21/10
[52] U.S. Cl. .................................... 280/806; 280/801; 297/473
[58] Field of Search ....................... 280/801, 804, 806; 297/473

[56] References Cited

U.S. PATENT DOCUMENTS 4,729,602 3/1988 Tokugawa ........................... 297/473
4,804,229 2/1989 Nishino ............................... 297/473

FOREIGN PATENT DOCUMENTS 2802617 7/1979 Fed. Rep. of Germany ...... 297/473

Primary Examiner—Kenneth R. Rice
Attorney, Agent, or Firm—Harness, Dickey & Pierce

[57] ABSTRACT

A seat belt anchorage mechanism, particularly adapted for motor vehicles, which allows a seat belt anchorage to move with the seat during fore-and-aft adjustment of the seat for improved occupant comfort and convenience. The mechanism has a toothed track fixed to the vehicle structure with a rail attached to the seat cushion slidable along the track. The belt anchorage assembly has a pair of separated plates having an engaging shaft positioned in close proximity to the toothed track. The anchorage assembly is fastened to a slide rail by frangible fasteners. When a load above a predetermined level is applied to the anchorage, the fasteners fail and enable the engaging shaft to mesh with a toothed track, thus locking the track and rail together and restraining forward excursion of the anchorage.

9 Claims, 3 Drawing Sheets

SEAT BELT ANCHORAGE

BACKGROUND AND SUMMARY OF THE INVENTION

This invention relates to a seat belt anchorage and particularly to one that is fixed to a movable occupant seat of a passenger car motor vehicle.

Occupant impact protection systems are presently required on all passenger motor vehicles. Such systems most frequently take the form of an active or passive seat belt assembly which restrains the occupant. The seat belt webbing is anchored to the floor pan of the vehicle along one or both of the lateral sides of the occupant seats. These anchorages must pass stringent strength requirements to ensure that they will adequately restrain the occupant during vehicle impact conditions.

Typical seat belt anchorages are directly mounted to the vehicle floor pan and have straps or extensions which position a seat belt buckle, latching plate or guide loop near the occupant for convenient access. Since the anchorages are mounted to the floor pan, when the occupant adjusts the seat in a fore-and-aft direction with the seat belt fastened, the belts tighten or loosen, depending on the direction of adjustment. This tightening or loosening behavior is inconvenient to the user since it requires readjustment of the belt.

In order to avoid the previously mentioned problems associated with floor mounted anchorage designs, it is desirable to mount a seat belt anchorage directly to the motor vehicle seat so that it moves with the seat during fore-and-aft adjustment. Due to the previously mentioned anchorage strength requirements, however, such a configuration imposes significant structural requirements for the seat adjustment mechanism and associated structure. Accordingly, there is a need to provide an improved seat belt anchorage system in which the anchorage moves with the seat while providing the necessary structural characteristics in an efficient manner.

The above mentioned desirable seat belt anchorage features are achieved by this invention. According to this invention, a belt anchorage assembly is provided which is attached to and movable with the sliding rail of the seat adjustment mechanism. A stationary toothed track fits within the rail and has teeth which mesh with a rotating pinion gear which provides seat position adjustment. The anchorage assembly includes an engagement shaft which directly engages the track teeth when a sufficient force is exerted on the anchorage plate to deform elements attaching the plate to the sliding rail. The engagement system according to this invention is capable of restraining high seat belt loads even though the anchorage is movable with the seat. The mechanism in accordance with this invention further provides the additional benefit of providing a visible "tell-tale" which enables investigators to easily determine whether or not the restraint system was deployed during a vehicle impact situation.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
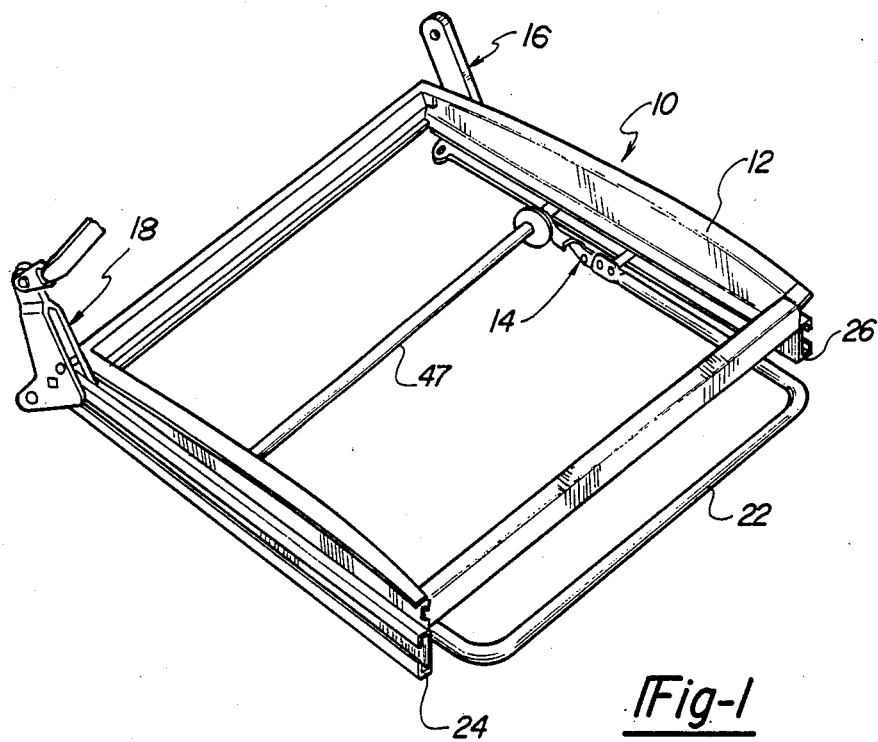
FIG. 1 is a pictorial view of a seat structure in accordance with this invention having a manually actuated fore-and-aft seat adjustment mechanism.

With particular reference to FIG. 1, a seat bottom frame assembly is shown incorporating the features of the present invention and is generally designated by reference number 10. Frame assembly 10 is adapted for supporting a seat bottom cushion (not shown) and allowing the seat to be adjusted to various fore-and-aft positions. Frame assembly 10 generally comprises a rectangularly shaped seat cushion support frame 12, fore-and-aft adjuster assembly 14, seat back recliner 16, and belt anchorage assembly 18. Seat back recliner 16 is adapted for attachment to a seat back support frame (not shown) which enables the reclined angle of a seat back to be adjusted as desired by the seat occupant.

Figure 2:
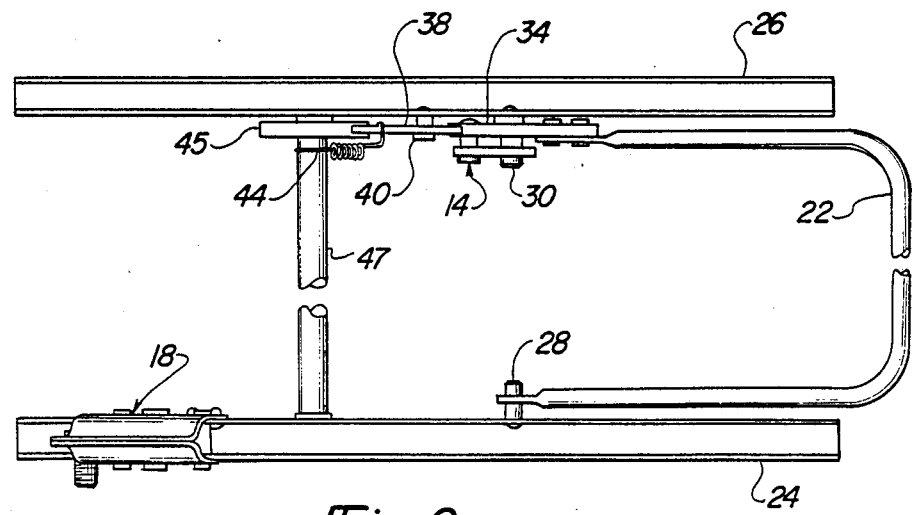
FIG. 2 is a plan view of the seat structure shown in FIG. 1.
Figure 3:
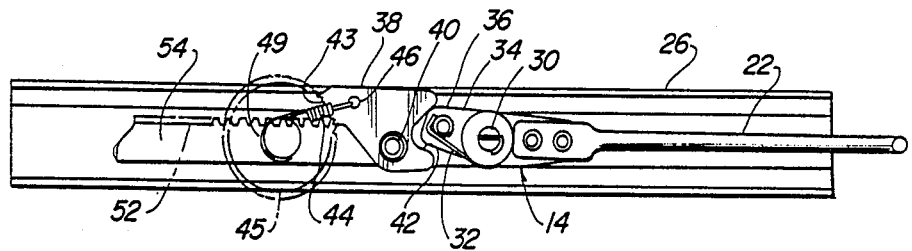
FIG. 3 is a partial side view of the seat structure shown in FIGS. 1 and 2, particularly showing the seat adjuster mechanism.
Figure 4:
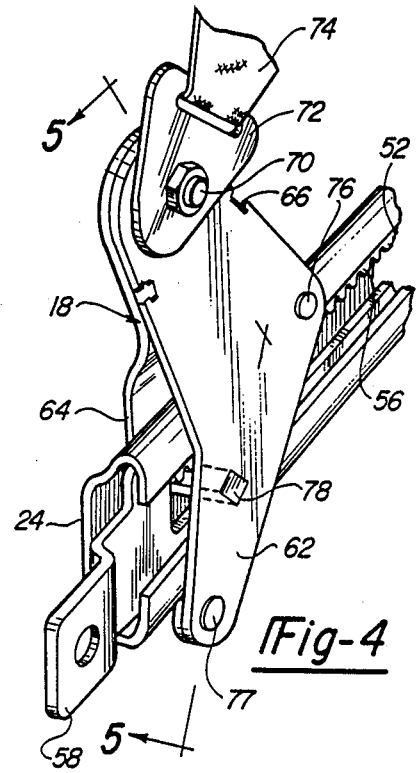
FIG. 4 is a pictorial view of a slide rail, toothed track, and anchorage assembly according to the present invention, shown cut-away from the surrounding seat structure.
Figure 5:
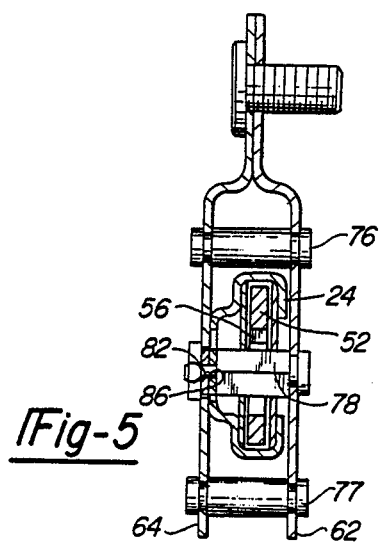
FIG. 5 is a cross-sectional view taken along line 5—5 of FIG. 4.

Adjuster assembly 14 is best shown with reference to FIGS. 2 and 3. Actuation bar 22 is generally "U" shaped, and is pinned for pivoting movement to a pair of laterally spaced "C" shaped slide rails 24 and 26 via pivot pins 28 and 30, respectively. Torsion spring 32 wraps around pivot pin 30 which biases bar 22 in a downward (clockwise) direction. Release lever 34 is pinned to one end of bar 22 for rotation about pivot pin 30, and includes a projecting lug 36. Adjustment pawl 38 is pinned for limited rotation to rail 26 about pin 40 and includes a cut-out cam surface 42 which interacts with lug 36. Adjustment pawl 38 has a toothed surface 43 which meshes with gear 45 which is fixed to shaft 47 extending laterally across the seat with gears 49 attached to its ends (only one shown). Extension spring 44 biases pawl 38 into engagement with gear 45. Toothed tracks 52 are slid into the interior cavities of slide rails 24 and 26. Tracks 52 have central slot 54 with downwardly projecting teeth 56. Mounting tabs 58 enable tracks 52 to be mounted to the vehicle's floor pan.

In operation, adjustment assembly 14 is released by lifting bar 22 which rotates lug 36, causing it to act upon cam surface 42 thus lifting adjustment pawl toothed surface 43 from its engagement with gear 45 and allowing gears 49 to rotate freely. While pawl 38 is disengaged, the seat occupant may freely move seat cushion support frame 12 to the desired position. Return of bar 22 to its normal position causes pawl 38 to re-engage with gear 45, thereby arresting rotation of gears 49 and preventing seat movement.

Belt anchorage assembly 18 forms a principal feature of the present invention, and is best described with reference to FIGS. 4 through 7. Anchorage assembly 18 includes a pair of plates 62 and 64 which are joined at their upper ends and are held there by interlocking tabs 66. Anchor bolt 70 passes through plates 62 and 64 at their upper extreme ends and secures belt plate 72 with webbing 74 attached thereto. Pins 76 and 77 pass through plates 62 and 64 to secure them and form a separation gap between them. Engaging shaft 78 has an upper surface configured to engage with track teeth 56 and passes laterally across the gap defined between plates 62 and 64.

Figure 6:
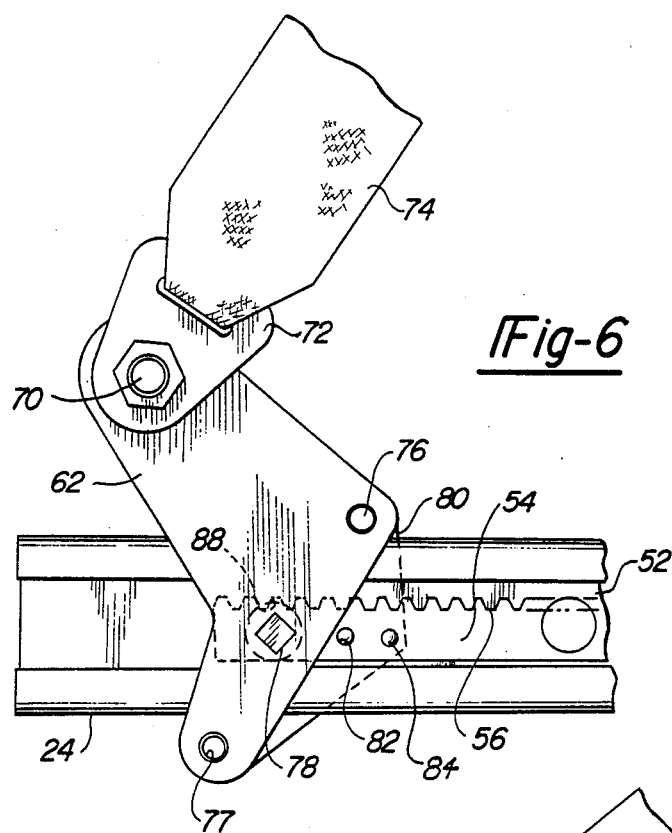
FIG. 6 is a side view of the belt anchorage assembly shown in its normal operating condition.

With particular reference to FIG. 6, plates 62 and 64 have a similar profile shape except that plate 64 has a forward extension 80 forming a pair of separated holes 82. Belt anchorage assembly 18 is mounted to and movable with slide rail 24 and is positioned such that engaging shaft 78 passes through track slot 54 and hole 88 in rail 24. Rivets 84 are installed through plate holes 82 and holes 86 in channel 24, and are selected to provide frangible connections which shear at a predetermined load exerted on webbing 74.

Figure 7:
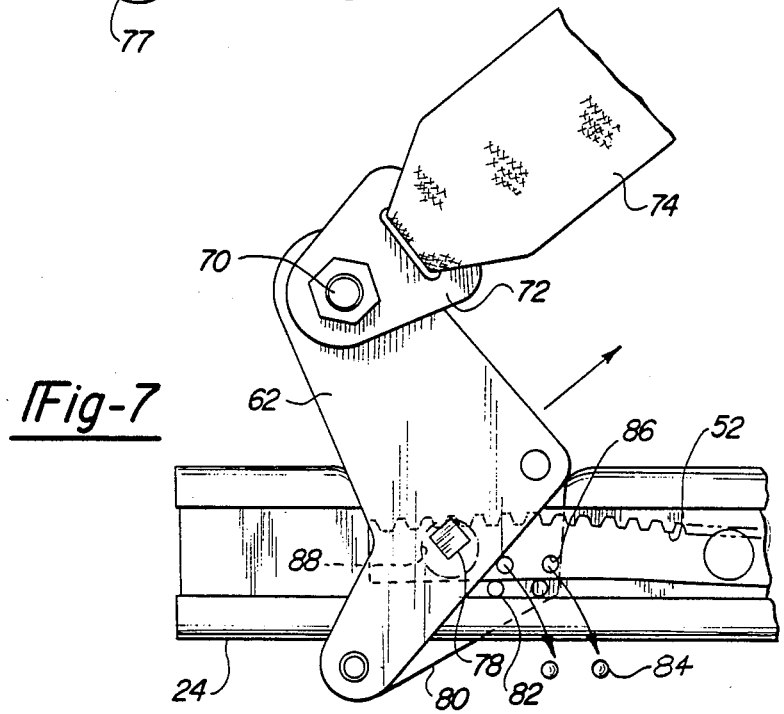
FIG. 7 is a side view similar to FIG. 6, but showing changes in the device when impact loads are exerted onto the seat belt webbing.

During normal use of the vehicle, seat bottom frame assembly 10 can be freely moved in a fore-and-aft direction upon actuation of bar 22. Since plates 62 and 64 are fastened to rail 24, belt anchorage assembly 18 also moves during seat adjustment, thereby overcoming the previously described problems of the described prior art designs. FIG. 6 represents the normal positioning of the elements, whereas FIG. 7 illustrates their orientation once a force above a predetermined level is exerted onto webbing 74 of a magnitude such as would be experienced in a frontal vehicle impact. In such conditions, a clockwise rotational force is exerted onto plates 62 and 64 and reaches a level causing rivets 84 to be sheared. The forces then acting on plates 62 and 64 causes them to be displaced upwardly such that shaft 78 engages with one of the track teeth 56. Rail hole 88 is sufficiently large to permit such upward displacement of shaft 78 without interference. When shaft 78 engages track 52, the track and sliding rail 24 become locked together, thus inhibiting forward excursion of anchorage assembly 18. If the impact loads acting on webbing 74 are sufficiently great, the upper edge (and/or lower edge) of slide rail 24 may plastically deform as shown in FIG. 7. Such deformation actually causes belt anchorage assembly 18 to become more firmly engaged with track 52, since the track becomes pinched between shaft 78 and pin 76.

Due to the fact that shearing of rivets 84 occurs which is perhaps accompanied by plastic deformation of the components, physical evidence or a so-called "tell-tale" is provided that indicates that significant loads were exerted on the belt anchorage, thus indicating that the restraint system was deployed during a vehicle impact. Such verification may be desirable for post-collision analysis.

While the above description constitutes the preferred embodiments of the present invention, it will be appreciated that the invention is susceptible to modification, variation and change without departing from the proper scope and fair meaning of the accompanying claims.

What is claimed is:

1. A seat assembly for a motor vehicle of the type providing fore-and-aft seat adjustment and having a seat belt anchorage movable with said seat, comprising:
   a toothed track,
   first mounting means for affixing said track to said motor vehicle,
   a slide rail engaging said toothed track and slideable along said toothed track,
   second mounting means for affixing said seat to said slide rail,
   an adjustment mechanism engageable with said toothed track for fixing a fore-and-aft position of said rail and said seat or allowing said position to be adjusted,
   first and second plate members affixed to one another and forming a gap therebetween and positioned with said track and said slide rail passing through said gap, said plate members being coupled to said seat belt,
   a pin member affixed to said plate members and positioned above said slide rail,
   an engaging shaft affixed to said plate members, and passing through said gap, and
   frangible force sensitive means for attaching said plate member to said rail and positioning said engaging shaft in close proximity to said track projecting teeth, whereby when a force above a predetermined magnitude is applied by said seat belt onto said plate members, said force sensitive means fails, thereby allowing said plate members to rotate causing said pin member to engage said slide rail and said shaft to engage said toothed track thereby coupling forces on said seat belt to said track.

2. A seat assembly according to claim 1 wherein said adjustment mechanism includes a pinion gear meshing with said toothed track and brake means for allowing rotation of said gear to permit said fore-and-aft adjustment, or arresting said rotation to fix said seat position.

3. A seat assembly according to claim 1 wherein said force sensitive means comprises at least one rivet attaching said plate member to said rail which shears upon loading by said predetermined force.

4. A seat assembly according to claim 1 wherein said engaging shaft forms an upwardly projecting pointed surface for engagement with downwardly projecting teeth formed by said toothed track.

5. A seat assembly according to claim 1 wherein said slide rail has a letter "C" shaped cross-section and envelope said toothed track.

6. A motor vehicle seat assembly of the type providing fore-and-aft seat adjustment of the seat cushion and having a seat belt anchorage movable with said seat cushion comprising:
   a toothed track having downwardly projecting teeth,
   first mounting means for affixing said track to said motor vehicle,
   an elongated slide rail engaging said toothed track and slideable along said toothed track,
   second mounting means for affixing said seat cushion to said seat,
   an adjustment mechanism engageable with said track teeth for fixing a desired fore-and-aft position of said seat cushion and allowing said positions to be changed as desired,
   first and second plate members affixed to one another and forming a gap therebetween and positioned with said track and said slide channel passing through said gap, at least one of said plate members forming an upper projection coupled to said seat belt,
   first and second pin means affixed to said plates with said first pin means positioned above said slide rail, an engaging shaft affixed to said plates, and passing through said gap, and frangible force sensitive means for attaching at least one of said plate members to said slide rail and positioning said engaging shaft in close proximity to said track projecting teeth, whereby when a force above a predetermined magnitude is applied by said seat belt onto said plate members, said force sensitive means fail thereby allowing said plate members to rotate causing said first pin means to engage said slide rail and said engaging shaft to engage said toothed track thereby coupling forces on said seat belt to said track.

7. A motor vehicle seat assembly according to claim 6 wherein said adjustment mechanism includes a pinion gear meshing with said toothed track teeth and brake means for allowing rotation of said gear to permit said fore-and-aft adjustment or arresting said rotation to fix said seat position.

8. A motor vehicle seat assembly according to claim 6 wherein said force sensitive means comprises at least one rivet attaching said plate member to said rail which shears upon loading by said predetermined force.

9. A motor vehicle seat assembly according to claim 6 wherein said engaging shaft forms an upwardly projecting pointed surface for engagement with said track teeth.

* * * * *